United States Patent [19]
Oda et al.

[11] Patent Number: 5,902,206
[45] Date of Patent: May 11, 1999

[54] DIFFERENTIAL GEAR ASSEMBLY

[75] Inventors: Hideaki Oda, Saitama-ken, Japan; Makoto Nishiji, La Louviere, Belgium

[73] Assignee: Zexel Corporation, Tokyo, Japan

[21] Appl. No.: 08/922,476

[22] Filed: Sep. 3, 1997

[30] Foreign Application Priority Data

Feb. 9, 1997 [JP] Japan ...................................... 9-040024

[51] Int. Cl.⁶ .......................... F16H 48/06; B60K 17/346
[52] U.S. Cl. ......................................................... 475/221
[58] Field of Search ............................................ 475/221

[56] References Cited

U.S. PATENT DOCUMENTS

| | | | |
|---|---|---|---|
| 4,627,513 | 12/1986 | Tutzer | 475/221 |
| 4,911,260 | 3/1990 | Miura et al. | 475/221 |
| 5,042,610 | 8/1991 | Shiraishi et al. | 475/221 |
| 5,176,589 | 1/1993 | Borgudd . | |
| 5,484,348 | 1/1996 | Brown et al. | 475/248 |
| 5,547,430 | 8/1996 | Gash | 475/221 |

FOREIGN PATENT DOCUMENTS

| | | |
|---|---|---|
| 0248577 | 12/1987 | European Pat. Off. . |
| 3000128 | 10/1980 | Germany . |
| WO 93/03939 | 3/1993 | WIPO . |

OTHER PUBLICATIONS

European Search Report dated May 29, 1998, 3 pages.

*Primary Examiner*—Dirk Wright

[57] ABSTRACT

A support perpendicular to a rotational axis of a housing is secured to one of one of first side gears. One pair of second planet gears are rotatably mounted on the support shaft. The one pair of second planet gears are meshed with one pair of second side gears. A second and a third output shaft are connected respectively to the one pair of second side gears. A first output shaft is connected to the other first side gear.

5 Claims, 5 Drawing Sheets

DIFFERENTIAL GEAR ASSEMBLY

BACKGROUND OF THE INVENTION

This invention relates to a differential gear assembly suited to be used for four-wheel drive vehicles.

In general, four-wheel drive vehicles each have three kinds of differential gear assemblies called a center differential, a front differential, and a rear differential. The center differential is disposed between the front wheels and the rear wheels, the front differential between the left front wheel and the right front wheel, and the rear differential between the left rear wheel and the right rear wheel, respectively. Those three kinds of differential gears are individually installed.

However, if such three kinds of differential gear assemblies must be installed separately as in the prior art, much time and labor is required for installation and in addition, a large installation space is required for installing the three differential gear assemblies as a whole.

SUMMARY OF THE INVENTION

It is, therefore, an object of the present invention to provide a differential gear assembly which can be installed in a comparatively small space.

To achieve the above object, according to a feature of the present invention, there is provided a differential gear assembly comprising a housing driven for rotation about a rotational axis thereof, a first planet gear supported by the housing such that the first planet gear is capable of rotation about an axis thereof and capable of rotation about the rotational axis of the housing together with the housing, and one pair of first side gears rotatably supported by the housing such that an axis of each of the one pair of first side gears is in alignment with the rotational axis of the housing and meshed with the first planet gear, wherein a second planet gear is disposed for rotation about an axis thereof on one of the first side gears such that the second planet gear rotates together with the first side gear, and one pair of second side gears meshed with the second planet gear are rotatably disposed on the housing such that an axis of each of the one pair of second side gears is in alignment with the rotational axis of the housing.

DETAILED DESCRIPTION OF THE EMBODIMENTS

One embodiment of the present invention will now be described with reference to the accompanying drawings.

Figure 1:
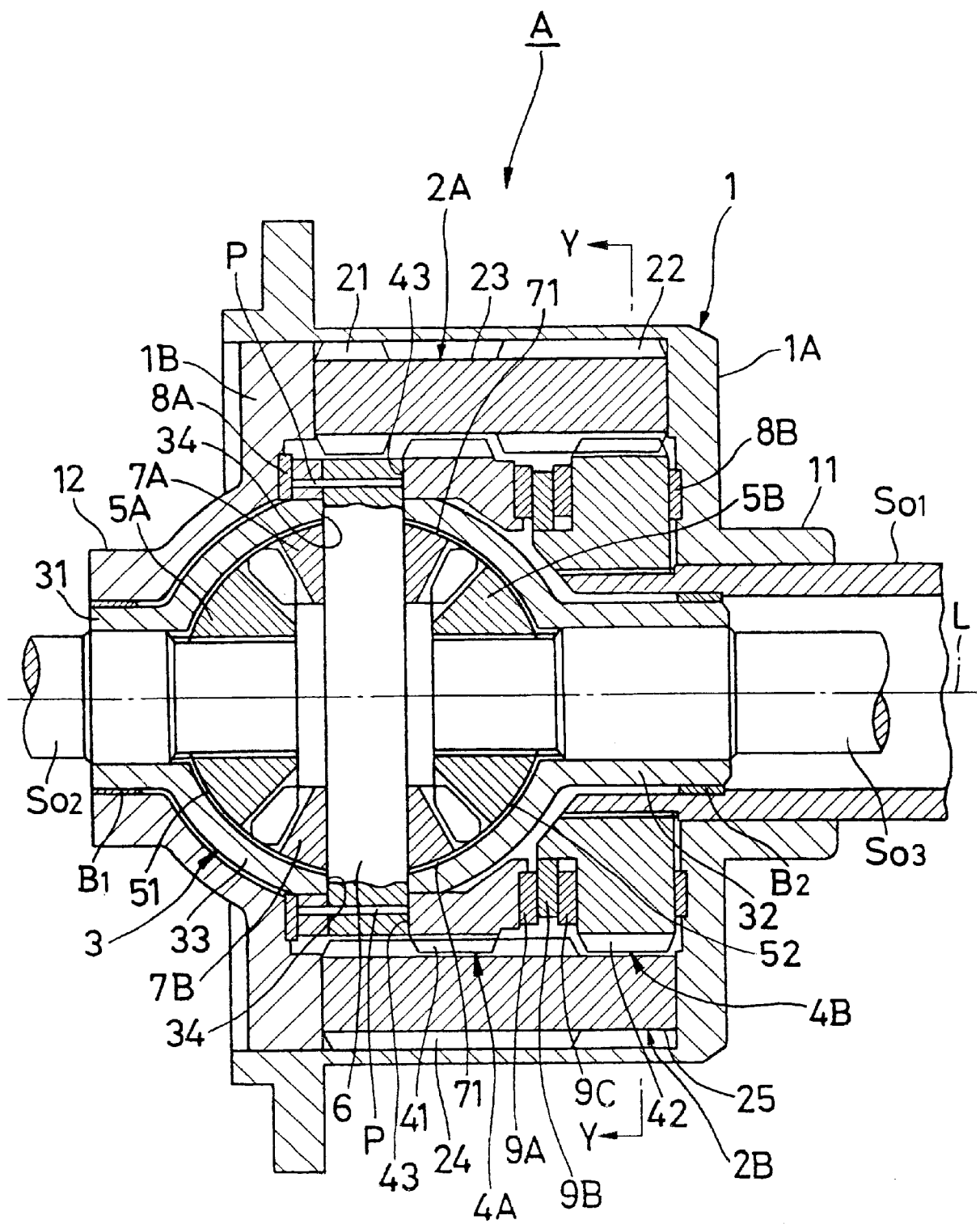
FIG. 1 is a sectional view taken on line X—X of FIG. 2, showing a differential gear assembly according to one embodiment of the present invention.
Figure 2:
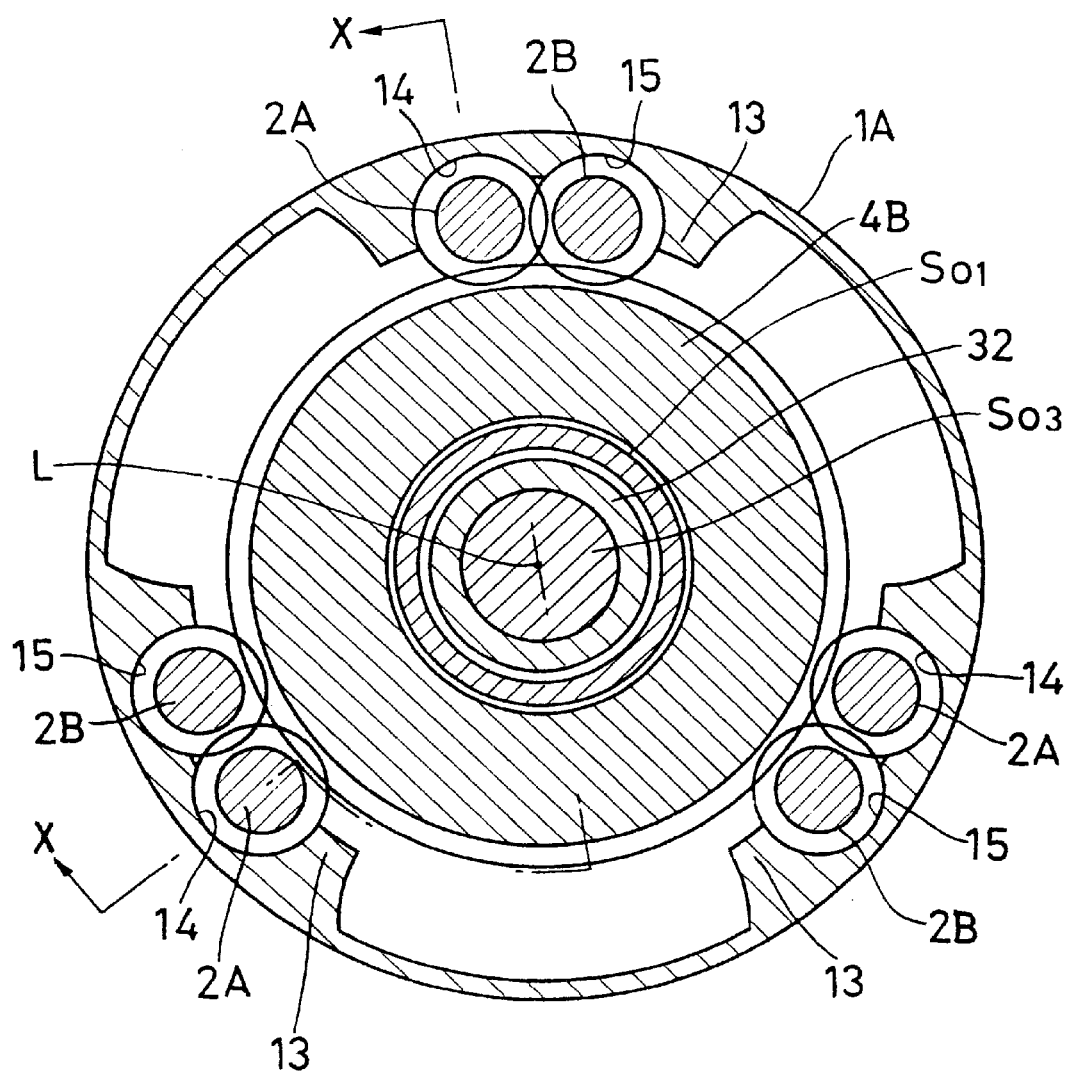
FIG. 2 is a sectional view taken on line Y—Y of FIG. 1.

FIGS. 1 and 2 show a differential gear assembly A according to the present invention. This differential gear assembly A includes a housing 1 driven for rotation about a rotational axis L. The housing 1 comprises a cylindrical housing body 1A having a closed bottom, and a closure 1B for closing an opening of the housing body 1A. The housing body 1A is provided at a center portion of its bottom portion and a center portion of the closure 1B respectively with cylindrical bearing portions 11, 12 extending along the rotational axis L. The housing body 1A is provided on an inner peripheral surface thereof with three protrusions 13. The protrusions 13 are equally spacedly arranged in a circumferential direction of the housing body 1A and extend from a bottom portion of the housing body 1A towards its opening portion. Each protrusion 13 is formed at a distal end face (a face on the side of its inner periphery) thereof with one pair of pockets 14, 15 each having a generally semicircular configuration in section. The pockets 14, 15 constituting one pocket pair extend from one end to the other end of each protrusion 13 in parallel relation with the rotational axis L.

One pair of first planet gears 2A, 2B are received respectively in each pair of the pockets 14, 15. The first planet gears 2A, 2B are rotatably (about their own axes) received in the pockets 14, 15, respectively. It is designed such that the first planet gears 2A, 2B once received in the pockets 14, 15 can rotate about the rotational axis L together with the housing 1.

The planet gear 2A of each pair of the first planet gears 2A, 2B, is formed at one end portion (left end portion of FIG. 1 [the terms "left and right" used hereinafter will refer to the left and the right side of FIG. 1]) thereof with a short gear portion 21, and at the other end portion (right end portion) thereof with a long gear portion 22. A reduced diameter portion 23 is formed between the short gear portion 21 and the long gear portion 22. The other first planet gear 2B is provided with a gear portion 24 having a length about ¾ of an overall length thereof from the left end to the right end. The gear 2B is also provided at a right end portion thereof with a reduced diameter portion 25. The planet gears 2A, 2B are meshed with each other at the short gear 21 and at a left end portion of the gear portion 24. The planet gears 2A, 2B are meshed with each other at a left end portion of the long gear portion 22 and a right end portion of the gear portion 24. In this embodiment, the short gear portion 21, the long gear portion 22 and the gear portion 24 all have helical teeth. It should be noted, however, that they may all have straight teeth.

A cylindrical first output shaft $S_{01}$ rotationally extends through the bearing portion 11 of the housing 1. A casing 3 is received in the housing 1. The casing 3 is provided at a left and a right end portion thereof with sleeve portions 31, 32 each having a circular configuration in section, and at a central portion thereof with a hollow ball portion 33. The sleeve portions 31, 32 are coaxial with each other. The center of the ball portion 33 is located on the co-axis of the sleeve portions 31, 32. The sleeve portion 31 is rotatably supported by the bearing portion 12 through a bush $B_1$.

The sleeve portion 32 is rotatably fitted to an inner peripheral surface of the first output shaft $S_{01}$ through a bush $B_2$ and rotatably supported by the bearing portion 11 of the housing 1 through the first output shaft $S_{01}$. Owing to this arrangement, the casing 3 is rotatably supported by the housing 1 such that an axis of the casing 3 is in alignment with the rotational axis L.

A cylindrical first side gear (one first side gear) 4A is fitted to an outer peripheral surface of a central portion of the ball portion 33 of the casing 3 such that an axis of the first side gear 4A is in alignment with the rotational axis L and the first side gear 4A is capable of movement in a direction of the rotational axis L. The other first side gear 4B, which forms one pair together with the first side gear 4A is fitted, for example by means of a spline fit, to a left end portion of the output shaft $S_{O1}$, which projects into an interior of the housing 1, such that the first side gear 4B is incapable of rotation but capable of movement in a direction of the rotational axis L relative to the output shaft $S_{O1}$. A gear portion 41 of the first side gear 4A is arranged at a location corresponding to a reduced diameter portion 23 of the planet gear 2A and meshed with a gear portion 24 of the planet gear 2B at its central portion. A gear portion 42 of the other first side gear 4B is arranged at a location corresponding to a reduced diameter portion 25 of the planet gear 2B and meshed with a long gear portion 22 of the planet gear 2A at its right end portion.

A second output shaft $S_{O2}$ rotatably extends through the sleeve portion 31 of the casing 3, and a third output shaft $S_{O3}$ extends through the other sleeve portion 32. Inner end portions of the second and third output shafts $S_{O2}$, $S_{O3}$ project into an interior of the ball portion 33, and fitted, for example by spline fit, to one pair of second side gears 5A, 5B each formed of a bevel gear. The second side gears 5A, 5B are incapable of rotation but capable of movement in a direction of the rotational axis L relative to the second and third output shafts $S_{O2}$, $S_{O3}$, respectively. Back surfaces (spherical surface portions) 51, 52 of the side gears 5A, 5B are each formed into a spherical surface having the same radius of curvature as the radius of an inner peripheral surface of the ball portion 33 so that the back surfaces 51, 52 may wholly contact the inner peripheral surface of the ball portion 33.

Figure 3:
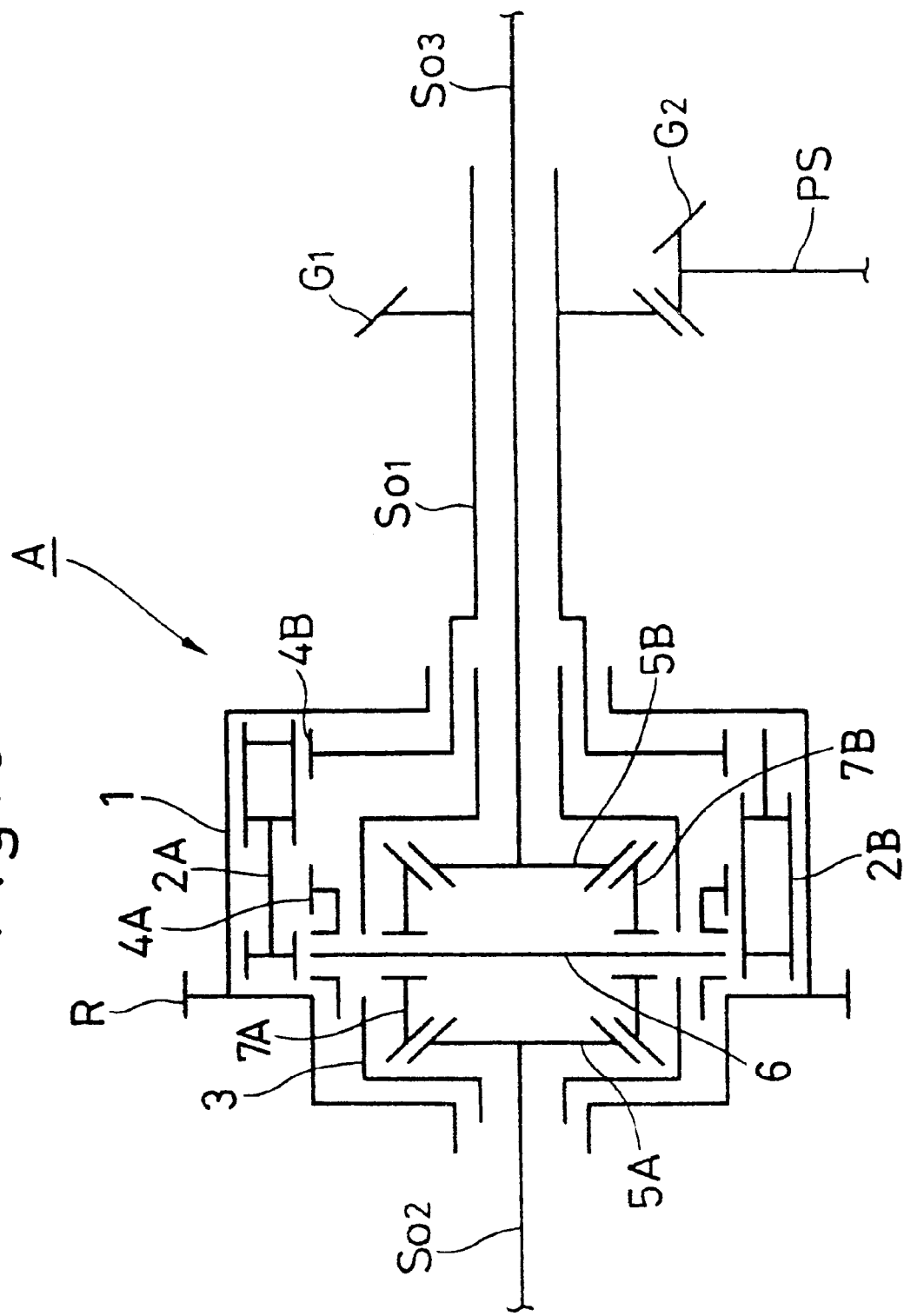
FIG. 3 is a schematic view showing a construction of the differential gear assembly of FIGS. 1 and 2, which is now used as a center differential gear and a front differential gear.

As shown in FIG. 3, an outer end portion of the third output shaft $S_{O3}$ extends through the first output shaft $S_{O1}$, and projects outside.

Within the ball portion 33 of the casing 3, a support shaft 6 having a circular configuration in section is arranged such that an axis of the support shaft 6 is perpendicular to the rotational axis L. Opposite end portions of the support shaft 6 extend through holes 34, 34 formed in the ball portion 33, each with a small space and fitted tightly (i.e., spacelessly) respectively to holes 43, 43 which are formed in the first side gear 4A, and secured to the first side gear 4A through pins P, P. Owing to this arrangement, the support shaft 6 rotates about the rotational axis L together with the first side gear 4A and the casing 3.

One pair of second planet gears 7A, 7B each formed of a bevel gear are rotatably fitted to the opposite end portions of the support shaft 6 within the ball portion 33. The second planet gears 7A, 7B are each meshed with the second side gears 5A, 5B. Back surfaces (spherical surface portions) 71, 72 of the second planet gears 7A, 7B are each formed into a spherical surface having the same radius of curvature as the radius of the inner peripheral surface of the ball portion 33, so that the back surfaces 71, 72 may wholly contact the inner peripheral surface of the ball portion 33.

An end washer 8A is disposed between a left end face of the first side gear 4A and the housing 1, and an end washer 8B is disposed between a right end face of the first side gear 4A and the housing 1. It is designed such that when the housing 1 and the first side gears 4A, 4B are relatively rotated, a frictional resistance is generated between the end washer 8A and the housing 1 or the first side gear 4A, or between the end washer 8B and the housing 1 or the first side gear 4B. Three center washers 9A, 9B, 9C are arranged between the first side gear 4A and the other first side gear 4B. The center washer 9B is unrotatably connected to the first side gear 4B and the center washer 9C is unrotatably connected to the housing 1. Owing to this arrangement, when the first side gears 4A, 4B are relatively rotated, a frictional resistance is generated between the center washer 9A and the first side gear 4A or the center washer 9B, between the center washer 9B and the center washer 9C, and between the center washer 9C and the first side gear 4B.

Operation of the differential gear assembly A thus constructed will now be described, in which the differential gear assembly A is used as a center differential and a front differential. It should be noted th at the differential gear assembly A may be used as a center differential and a rear differential. Operation is the same.

As shown in FIG. 3, a ring gear R is attached to the housing 1 of the differential gear assembly A. The housing 1 is driven for rotation by an engine (not shown) through the ring gear R. The first output shaft $S_{O2}$ is connected to a propeller shaft PS through the bevel gears $G_1$, $G_2$, and then connected to a rear differential (not shown) through the propeller shaft PS. The second and the third output shaft $S_{O2}$, $S_{O3}$ is connected to a left and a right front wheel (not shown).

When the housing 1 is driven for rotation, its rotary torque is transmitted to the first side gears 4A, 4B through the first planet gears 2A, 2B, respectively. The rotary torque transmitted to the first side gear 4A is transmitted to the second planet gears 7A, 73 through the support shaft 6. The rotary torque transmitted to the second planet gears 7A, 71 is transmitted to the left and right front wheels through the second side gears 5A, 5B and the second and third output shafts $S_{O2}$, $S_{O3}$.

The rotary torque transmitted to the first side gear 4B is transmitted to the rear differential through the first output shaft $S_{O1}$, the bevel gears $G_1$, $G_2$, and the propeller shaft PS.

In case the speed of rotation (average speed of rotation of the left and right front wheels) of the front wheels is equal to the speed of rotation (average speed of rotation of the left and right rear wheels) of the rear wheels here, the first planet gears 2A, 2B and the second planet gears 7A, 7B are not rotated about their own axes, and the overall differential gear assembly A is rotated as one body. Therefore, the output shafts $S_{O1}$ to $S_{O3}$ are rotated at the same speed.

In case the speed of rotation of the front wheels is different from the speed of rotation of the rear wheels, the first planet gears 2A, 2B are rotated about their own axes, and the first side gears 4A, 4B are relatively reversely rotated. That is, one of the side gears 4A, 4B is rotated at a high speed with respect to the housing 1, and the other side gear is rotated at a low speed to that extent with respect to the housing 1. At that time, when the side gear 4A rotated at a high speed and the 4B is rotated at a low speed, a rotary torque is transmitted from the side gear 4A towards the side gear 4B, and when the side gear 4B is rotated at a high speed and the side gear 4A is rotated at a low speed, a rotary torque is transmitted from the side gear 4B towards the side gear 4A due to frictional resistance generated to the end washers 8A, 8B and the center washers 9A to 9C and due to frictional resistance generated between the outer peripheral surfaces of the first and second planet gears 2A, 2B and the inner peripheral surfaces of the pockets 14, 15. As a consequence, a rotary torque is transmitted to the front and rear wheels at a prescribed torque bias ratio.

In case the left and right front wheels are rotated at different speeds of rotation, the second planet gears 7A, 7B are rotated about their own axes, and the second side gears 5A, 5B are reversely rotated relative to the housing 1.

In the differential gear assembly A having the above-mentioned construction, the support shaft 6 is connected to the first side gear 4A so that the support shaft 6 rotates together with the first side gear 4A, the second planet gears 7A, 7B are rotatably mounted on the support shaft 6, the second planet gears 7A, 7B are meshed with the second side gears 5A, 5B, and two differential gear mechanisms one used as a center differential gear and the other as a front differential gear are installed within the housing 1. Therefore, in case this differential gear assembly A is used, it is no more required to provide the center differential and the front differential separately. Only a provision of the differential gear assembly A is enough for the purpose. Thus, the time and labor, as well as the space, required for installation can be reduced extensively compared with the case where the center differential and the front differential are separately installed.

Since the rotary torque of the first side gear 4A is transmitted to the second planet gears 7A, 7B through the support shaft 6, almost no rotary torque is transmitted to the casing 3. Therefore, the casing 3 can be omitted. By doing so, the differential gear assembly A can be designed more compact in size. In case the casing 3 is omitted, the inner peripheral surface of the first side gear 4A and the inner end face of the closure 1B may be each formed into a configuration capable of receiving the second planet gears 7A, 7B and the second side gears 5A, 5B.

Further embodiments of the present invention will now be described with reference to FIGS. 4 and 5. In those embodiments, description is made only with respect to a different construction from that of the above-mentioned embodiment, like parts are each denoted by like reference numeral and description thereof is omitted.

Figure 4:
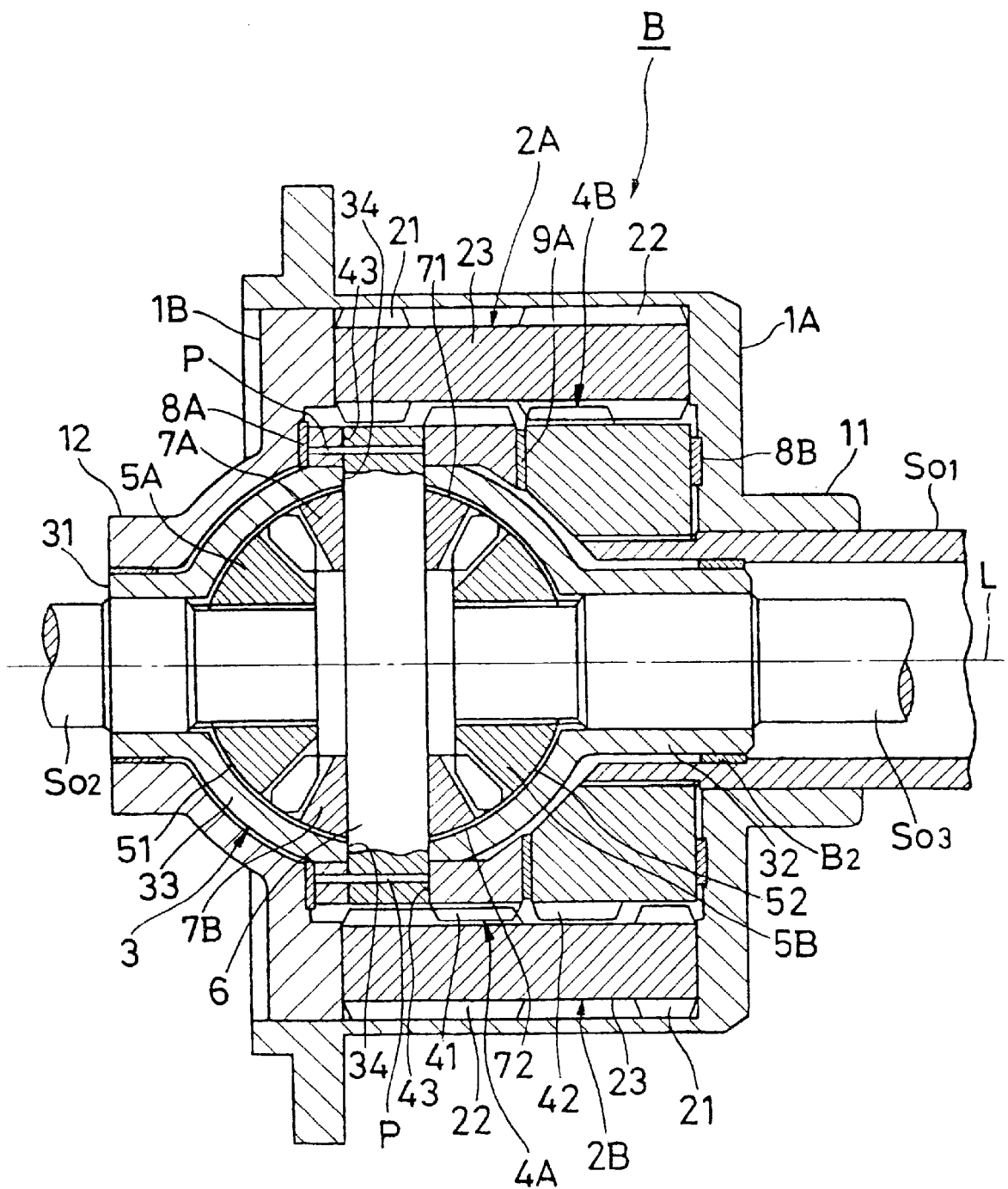
FIG. 4 is a sectional view, similar to FIG. 1, showing a differential gear assembly according to another embodiment of the present invention.

A differential gear assembly B of FIG. 4 has a first planet gear 2B which is constructed in the same manner as the second planet gear 2A. The short end portion 21 of the planet gear 2A is meshed with the long gear portion 22 of the planet gear 2B at a left end portion of the long gear portion 22, and the long gear portion 22 of the planet gear 2A are meshed with the short gear portion 21 of the planet gear 2B at a right end portion of the long gear portion 22. Only one center washer 9A is disposed between the first side gear 4A and the other first side gear 4B.

Figure 5:
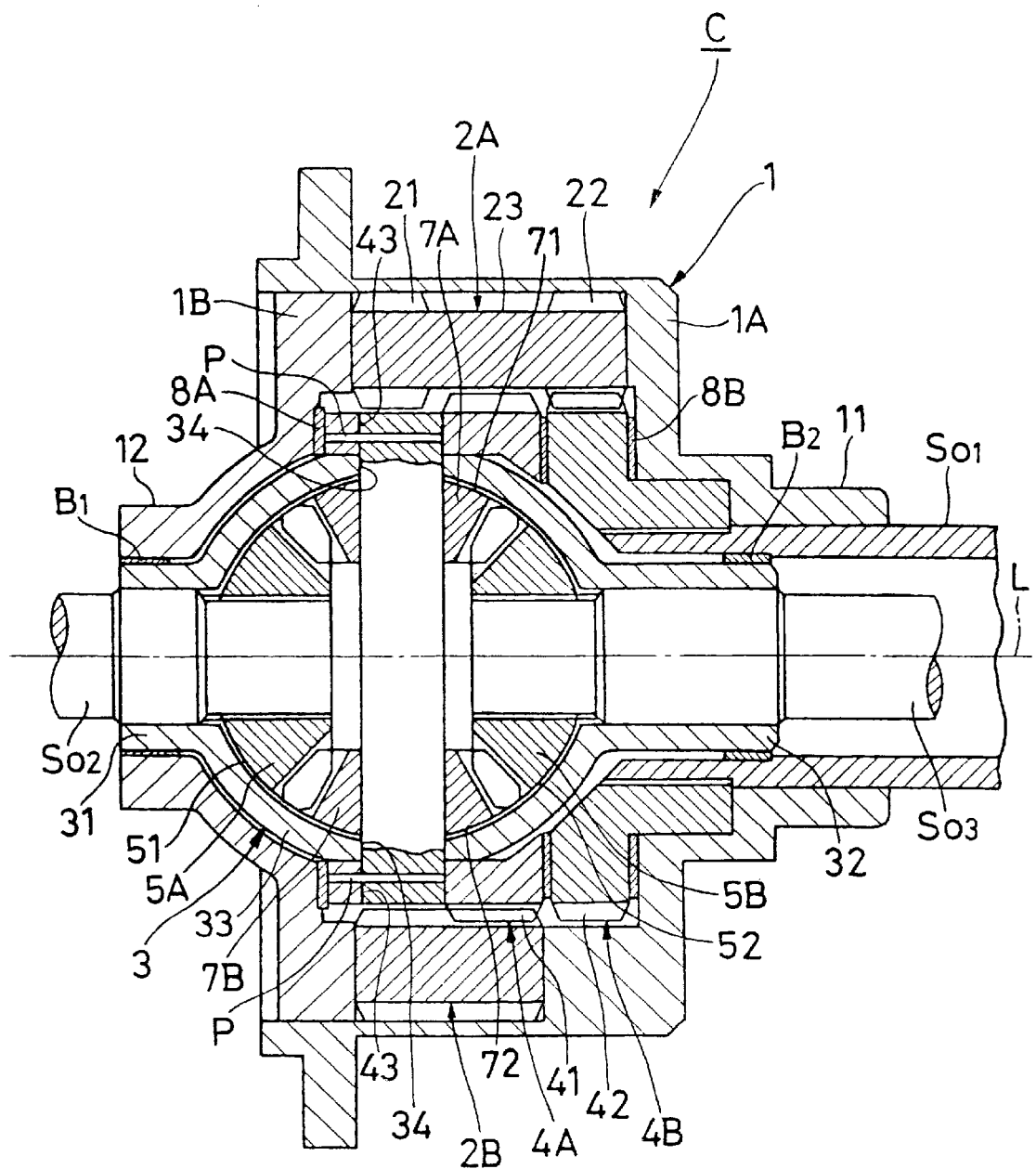
FIG. 5 is a sectional view, similar to FIG. 1, showing a differential gear assembly according to a further embodiment of the present invention.

A differential gear assembly C of FIG. 5 has a first planet gear 2B meshed with only the short gear portion 21 of the first planet gear 2A and the first side gear 4A. The first planet gear 2B is shorter than the comparable first planet gear 2B of the above-mentioned embodiment by the portion which is meshed with the long gear portion 22 of the first planet gear 2A and by the reduced diameter portion 25. The long gear portion 22 of the first planet gear 2A becomes shorter by the portion which is not meshed with the first planet gear 2B.

It should be noted that the present invention is not limited to the above-mentioned embodiments and that many modifications can be made.

For example, in the above-mentioned embodiments, the planet gears 2A, 2B parallel to the rotational axis L of the housing 1 are used as the first planet gears. It is an interesting alternative that those planet gears each having an axis perpendicular to the rotational axis L are used as the first planet gears. In that case, only one planet gear instead of two second planets gears 7A, 7B is good enough.

Further, in the above embodiments, the second planet gears 7A, 7B are mounted for rotation about their own axes on the first side gear 4A through the support shaft 6 such that the second planet gears 7A, 7B rotate together with the first side gear 4A. However, the second planet gears 7A, 7B may be attached directly to the first side gear 4A.

In the differential gear assembly A of the first-mentioned embodiment, the outer peripheral surface of the central portion of the ball portion 33 of the casing 3 is tightly fitted to the inner peripheral surface of the first side gear 4A. However, the former may be fitted to the latter with a comparatively large space. In case the former is tightly fitted to the latter, the first side gear 4A is rotatably supported by the housing 1 through the casing 3 such that the axis of the first side gear 4A is in alignment with the rotational axis L. In case the former is fitted to the latter with a comparatively large space, the axis of the first side gear 4A is automatically brought into alignment with the rotational axis L by causing the first side gear 4A to mesh with three first planet gears 2B. Moreover, the precision required for the outer diameter of the casing 3 is not very severe. Thus, the manufacturing cost of the casing 3 can be lowered.

What is claimed is:

1. A differential gear assembly comprising:

a housing driven for rotation about a rotational axis thereof, a first planet gear supported by said housing such that said first planet gear is capable of rotation about an axis thereof and capable of rotation about the rotational axis of said housing together with said housing, a pair of first side gears rotatably supported by said housing, said first side gears being in alignment with each other and disposed coaxially with said housing, and having external gear portions that mesh with said first planet gear, wherein one of said first side gears is formed of a sleeve extending along the rotational axis of said housing and having two openings at opposite end portions thereof, a support shaft disposed in said sleeve openings of said one first side gear, the support shaft extending perpendicularly to the rotational axis of said housing, and a second planet gear disposed on said support shaft and capable of rotation about an axis of said second planet gear, and a pair of second side gears meshed with said second planet gear and being rotatably disposed in said one first side gear such that an axis of each of said second side gears is in alignment with the rotational axis of said housing.

2. A differential gear assembly according to claim 1, wherein at least one pair of said first planet gears are provided in parallel relation with the rotational axis of said housing, said one pair of first planet gears are meshed with each other and also with said one pair of said side gears.

3. A differential gear assembly according to claim 2, wherein three or more of said first planet gears are provided, and said three or more of said first planet gears are equally spacedly arranged in a circumferential direction of said housing.

4. A differential gear assembly according to claim 1, wherein a hollowing casing having two openings each at opposite end portions thereof in the rotational axis of said housing is inserted into an interior of said one first side gear with said support shaft allowed to extend through said hollow casing, and second planet gear and said pair of second side gears are arranged within said casing.

5. A differential gear assembly according to claim 4, wherein said casing includes a ball portion having a spherical inner surface, and said second planet gear and said pair of second side gears each have a spherical surface portion which is in surface contact with the inner surface of said ball portion.

* * * * *